United States Patent [19]
Mizuno

[11] Patent Number: 4,573,770
[45] Date of Patent: Mar. 4, 1986

[54] TELEPHOTO LENS SYSTEM
[75] Inventor: Shinichi Mizuno, Tokyo, Japan
[73] Assignee: Olympus Optical Co., Ltd., Tokyo, Japan
[21] Appl. No.: 620,329
[22] Filed: Jun. 12, 1984
[30] Foreign Application Priority Data
 Jun. 17, 1983 [JP] Japan .................. 58-107863
[51] Int. Cl.⁴ .......... G02B 9/60; G02B 9/62; G02B 13/02
[52] U.S. Cl. ............................................ 350/454
[58] Field of Search ................................ 350/454
[56] References Cited
 U.S. PATENT DOCUMENTS
 3,854,797 12/1974 Yokota .
 4,113,357 9/1978 Nakamura .
 4,241,983 12/1980 Kitagishi .

FOREIGN PATENT DOCUMENTS
2518457 11/1975 Fed. Rep. of Germany .

Primary Examiner—John K. Corbin
Assistant Examiner—Rebecca D. Gass
Attorney, Agent, or Firm—Cushman, Darby & Cushman

[57] ABSTRACT

A telephoto lens system comprising a front lens group, and a rear lens group comprising a first subgroup and a second subgroup, said front lens group comprising a first positive lens component, a second positive lens component and a negative lens component, said first subgroup comprising a negative cemented lens component, and said second subgroup comprising a positive cemented lens component. Said lens system has a large aperture and favorably corrected aberrations, especially the secondary spectrum.

8 Claims, 8 Drawing Figures

TELEPHOTO LENS SYSTEM

BACKGROUND OF THE INVENTION (a) Field of the Invention

The present invention relates to a large-aperture super-telephoto lens system having the favorably corrected secondary spectrum.

(b) Description of the Prior Art

In a telephoto lens system having a long focal length, it is more difficult to correct chromatic aberration, especially the secondary spectrum, than in a lens system having a short focal length. Further, as a lens system has a longer focal length, its total length is prolonged, thereby making it more difficult to perform focusing by displacing the lens system as a whole.

For this reason, some of the conventional telephoto lens systems are so designed as to correct the secondary spectrum by using fluorite and anormally dispersive glass as materials for the front lens components through which rays transmit at their high portions. There have also been known the conventional telephoto lens systems so adapted as to perform focusing by displacing only the rear lens components having relatively small diameters. However, these conventional telephoto lens systems have small aperture ratios on the order of F/4.5 and are inconvenient in handling due to the first lens component (front lens component) made of fluorite which can easily be injured.

SUMMARY OF THE INVENTION

A general object of the present invention is to provide a telephoto lens system having a large aperture ratio on the order of F/4 and favorably corrected aberrations, especially the secondary spectrum.

The lens system according to the present invention basically comprises a front lens group having positive refractive power, and a rear lens group comprising a first subgroup having negative refractive power and a second subgroup having positive refractive power. The lens system according to the present invention adopts a rear focus method so adapted as to focus said lens system on objects located within a range from infinity to short distance by displacing said second and third subgroups in said rear lens group along the optical axis.

In order to design this type of lens system so as to have a large aperture ratio, it is important to correct aberrations due to high paraxial rays. Further, a problem is posed to minimize variations of aberrations in rear focusing.

The telephoto lens system according to the present invention is so designed as to correct aberrations at a large aperture ratio and prevent variations of aberrations during the rear focusing by selecting the above-described besic composition, composing said front lens group having positive refractive power of a first positive lens component, a second positive lens component and a negative lens component, designing these lens components so as to satisfy the following conditions (1) through (3), composing said first subgroup having negative refractive power so as to comprise a negative cemented lens component, and composing said second subgroup having positive refractive power so as to comprise a positive cemented lens component.

$$0.2 < \frac{\phi_1}{\phi_2} < 0.8 \quad (1)$$

$$-1 < \frac{r_3 + r_4}{r_3 - r_4} < 0 \quad (2)$$

$$1 < \left|\frac{\phi_3}{\phi_1}\right| < 2 \quad (3)$$

wherein the reference symbols are defined as follows:

$\phi_1$, $\phi_2$ and $\phi_3$: refractive powers of the first positive lens compoennt, second positive lens component and negative lens component respectively arranged in said front lens group $r_3$ and $r_4$: radii of curvature on the object side surface and image said surface of the second positive lens component respectively arranged in front lens group.

Now, significance of the above-mentioned conditions (1) through (3) will be described. The condition (1) defines a ratio in refractive power between the first and second positive lens components arranged in said front lens group.

In order to correct chromatic aberration, the first positive lens component should have high refractive power since rays are incident on the high portion of said first positive lens component. However, the second positive lens component should have high refractive power for favourably correcting the secondary spectrum since a flourite having a large Abbe's number and high partial despersion ratio is used, as described later, as the material for the second positive lens component arranged in said first subgroup of the telephoto lens system according to the present invention. It is therefore necessary to limit $|\phi_1/\phi_2|$ within the range defined by the condition (1). If $|\phi_1/\phi_2|$ is smaller than the lower limit of the condition (1), each surface of the second positive lens component will have a small radius of curvature, thereby allowing high order aberrations such as spherical aberration and coma to be aggravated. If the upper limit of the condition (1) is exceeded, in contrast, the first positive lens component will have high refractive power and the second positive lens component will have low refractive power, resulting in undercorrection of the secondary spectrum.

The condition (2) defines radii of curvature on the object side surface and image side surface respectively of the second positive lens component arranged in said front lens group. By designing the lens system so as to satisfy the condition (2), it is possible to prevent the high order aberrations such as spherical aberration and coma from being produced, and minimize variations of aberrations during focusing of said lens system on objects located within a range from infinity to short distance. If upper or lower limit of the condition (2) is exceeded, the higher order aberrations such as spherical aberration and coma will undesirably, be aggravated, and variations of aberrations will be increased during focusing of the lens system.

The condition (3) defines refractive power of the negative lens component arranged in said front lens group. If $|\phi_3/\phi_1|$ has a value smaller than the lower limit of the condition (3), the secondary spectrum will be undercorrected. If the upper limit of the condition (3) is exceeded, in contrast, both the surfaces of the negative lens component will have small radii of curvature, thereby allowing the high order aberrations such as spherical aberration and coma to be aggravated, and making it difficult to obtain favorable imaging performance.

Further, the telephoto lens system according to the present invention is so designed as to prevent production of spherical aberration, astigmatism, coma and chromatic aberration by arranging a negative cemented lens component in the first subgroup. Furthermore, the lens system according to the present invention is so designed as to minimize variations of spherical aberration and curvature of field at different wavelengths by arranging a positive cemented lens component in the second subgroup having positive refractive power.

Moreover, the lens system according to the present invention is so designed as to minimize variations of aberrations during focusing by displacing the first and second subgroups at the same time toward the image side and object side respectively for focusing. Speaking more concretely, when the rear focus method is adopted in the telephoto lens system, aberrations produced in the front lens group vary relatively little since height of rays incident on the front lens group remains unchanged when the lens system is focused on an object located at a short distance. On the other hand, aberrations produced by the first and second subgroups vary remarkably since both the subgroups are displaced and heights of rays incident on these subgroups vary remarkably. However, aberrations can be maintained constant when variations of aberrations produced on both the subgroups can be cancelled each other.

In the lens system according to the present invention, aberrations are maintained substantially constant in the lens system as a whole since each aberration produced by the front lens group having positive refractive power is reduced by displacing the first subgroup having negative refractive power toward the image side, and then increased by displacing the second subgroup having positive refractive power toward the object side.

Further, the first and second subgroups should desirably have focusing functions of the similar degrees so as to minimize variations of aberrations to be caused by displacing the subgroups. For this purpose, it is desirable to design the first and second subgroups so as to have refractive powers $\phi II$ and $\phi III$ respectively satisfying the following condition (4):

$$1 < |\phi II/\phi III| < 3 \qquad (4)$$

If $|\phi II/\phi III|$ has a value smaller than the lower limit of the condition (4), refractive power $\phi III$ of the second subgroup is large relative to the absolute value $|\phi II|$ of refractive power of the first subgroup, thereby prolonging total length of the lens system as a whole and degrading its operability. If the upper limit of the condition (4) is exceeded, in contrast, it will be difficult to maintain the capability to change distance to an object to be photographed of the first and second subgroups at the similar degrees, thereby increasing variations of aberrations.

In a lens system having the above-described composition, it is effective for eliminating the secondary spectrum to select a glass material for each lens component as described below:

In a telephoto lens system comprising a front lens group having positive refractive power as a whole and a rear lens group having negative refractive power as a whole, it is already known that the secondary spectrum can be eliminated by using a glass material having a large Abbe's number and a large partial dispersion ratio for the positive lens elements, and a glass material having a small Abbe's number and a small partial dispersion ratio for the negative lens element in said front lens group. Optical crystals such as fluorite are optimum as glass materials having large Abbe's numbers and large partial dispersion ratios, and it is effective for preventing the secondary spectrum to use fluorite or the similar material for the first positive lens component on which incident rays are highest. However, it is not practical to use an optical crystal such as fluorite for the first lens component of the lens system since the material can easily be injured. Some conventional examples using fluorite as material for the first lens component in combination with protective glass arranged therebefore exhibit low operability since the protective glass prolongs total lengths of the lens systems and make them heavier.

The lens system according to the present invention is so designed as to favorably correct the secondary spectrum without degrading practical utility or operability by composing the front lens group of a positive lens component, a positive lens component and a negative lens component, selecting for the first lens component an anormally dispersive glass material which is free from fear of injury and has a large Abbe's number in addition to a large partial dispersion ratio, and using for the negative lens component a lanthanum series of glass material which has a relatively small Abbe's number and a small partial dispersion ratio.

Further, the first subgroup arranged in the rear lens group of the present invention has a composition including a negative cemented lens component consisting of two lens elements which are different in refractive index and Abbe's number so as to suppress spherical aberration, astigmatism, coma and chromatic aberration to the possible lowest levels during displacement of said subgroup for focusing. Furthermore, the second subgroup arranged in the rear lens group has a composition including a positive cemented lens component consisting of two lens elements which are nearly equal in refractive index but different relatively largely in Abbe's number so as to correct chromatic aberration by this subgroup itself. Therefore, spherical aberration and chromatic aberration of curvature of field can easily be corrected when these subgrups are displaced for focusing.

Refractive indices $n_4$, $n_5$ and Abbe's numbers $\nu_4$, $\nu_5$ of the two lens elements of the negative cemented lens component arranged in the first subgroup, and Abbe's numbers $\nu_a$ and $\nu_b$ of the two lens elements of the positive cemented lens component arranged in the second subgroup should desirably satisfy the following conditions (5), (6) and (7):

$$0.1 < |n_4 - n_5| \qquad (5)$$

$$10 < |\nu_4 - \nu_5| \qquad (6)$$

$$5 < |\nu_1 - \nu_b| \qquad (7)$$

The above mentioned condition (5) defines difference between refractive indices of both the lens elements of the negative cemented lens component arranged in the first subgroup. When the lens system satisfies this condition, undercorrection of spherical aberration and variations of aberrations such as astigmatism are minimized when said lens system is focused on an object located at a short distance. If this condition is not satisfied, aberrations will be varied remarkably.

The conditions (6) and (7) define difference between Abbe's numbers of both the lens elements of the negative cemented lens component arranged in the first subgroup and difference between Abbe's numbers of both the elements of the positive cemented lens component arranged in the second subgroup respectively. The conditions (6) and (7) are adopted for minimizing chromatic aberrations such as lateral chromatic aberration. If either of these conditions is not satisfied, variations of chromatic aberrations will undesirably be remarkable.

DETAILED DESCRIPTION OF THE PREFERRED EMBODIMENTS

Figure 1:
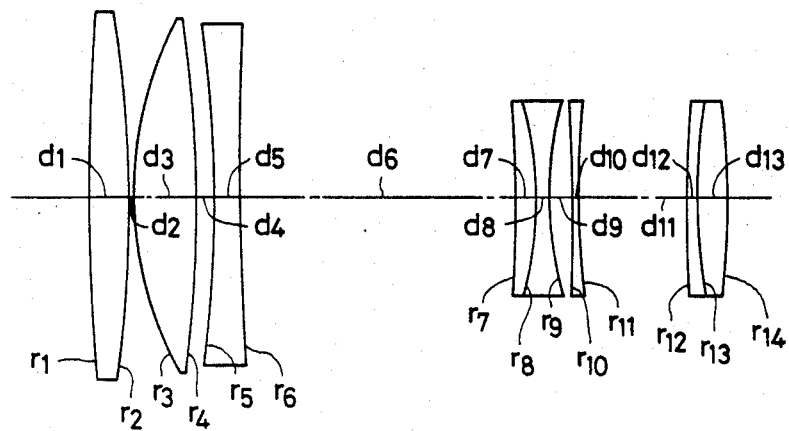
FIG. 1 shows a sectional view illustrating composition of Embodiment 1 of the telephoto lens system according to the present invention.

Now, some preferred embodiments of the telephoto lens system according to the present invention will be described below:

Embodiment 1

| | $f = 100$, | $F/4$, | $2\omega = 5.1°$ | |
|---|---|---|---|---|
| $r_1 =$ | 144.4586 | | | |
| | $d_1 = 2.9054$ | | $n_1 = 1.49700$ | $\nu_1 = 81.61$ |
| $r_2 =$ | $-81.4129$ | | | |
| | $d_2 = 0.3106$ | | | |
| $r_3 =$ | 26.7945 | | | |
| | $d_3 = 4.3918$ | | $n_2 = 1.43389$ | $\nu_2 = 95.15$ |
| $r_4 =$ | $-87.9322$ | | | |
| | $d_4 = 1.1610$ | | | |
| $r_5 =$ | $-83.2180$ | | | |
| | $d_5 = 1.6889$ | | $n_3 = 1.80440$ | $\nu_3 = 39.58$ |
| $r_6 =$ | 184.2057 | | | |
| | $d_6 = 19.6181$ | | | |
| $r_7 =$ | $-85.1515$ | | | |
| | $d_7 = 1.4686$ | | $n_4 = 1.80518$ | $\nu_4 = 25.43$ |
| $r_8 =$ | $-22.7746$ | | | |
| | $d_8 = 0.8263$ | | $n_5 = 1.61340$ | $\nu_5 = 43.84$ |
| $r_9 =$ | 20.4856 | | | |
| | $d_9 = 1.4433$ | | | |
| $r_{10} =$ | $-239.0739$ | | | |
| | $d_{10} = 0.8262$ | | $n_6 = 1.57309$ | $\nu_6 = 42.57$ |
| $r_{11} =$ | 183.2627 | | | |
| | $d_{11} = 7.2647$ | | | |
| $r_{12} =$ | 58.0617 | | | |
| | $d_{12} = 0.8145$ | | $n_7 = 1.62004$ | $\nu_7 = 36.25$ |
| $r_{13} =$ | 34.5908 | | | |
| | $d_{13} = 2.1649$ | | $n_8 = 1.61800$ | $\nu_8 = 63.38$ |
| $r_{14} =$ | $-59.4044$ | | | |

-continued

| $f = 100$, | $F/4$, | $2\omega = 5.1°$ |
|---|---|---|

$$\frac{\phi_1}{\phi_2} = 0.455, \quad \left|\frac{\phi_3}{\phi_1}\right| = 1.481, \quad \frac{r_3 + r_4}{r_3 - r_4} = -0.533$$

$$\left|\frac{\phi_{II}}{\phi_{III}}\right| = 1.779, \quad n_4 - n_5 = 0.192, \quad \nu_4 - \nu_5 = -18.41$$

$$\nu_a - \nu_b = \nu_7 - \nu_8 = -27.13$$

| | $d_6$ | $d_{11}$ |
|---|---|---|
| ∞ | 19.6181 | 7.2647 |
| 1216 | 21.6039 | 2.1367 |

Embodiment 2

| | $f = 100$, | $F/4$, | $2\omega = 5.1°$ | |
|---|---|---|---|---|
| $r_1 =$ | 136.5419 | | | |
| | $d_1 = 2.9120$ | | $n_1 = 1.45600$ | $\nu_1 = 90.31$ |
| $r_2 =$ | $-73.1087$ | | | |
| | $d_2 = 0.3112$ | | | |
| $r_3 =$ | 29.9494 | | | |
| | $d_3 = 3.9034$ | | $n_2 = 1.43389$ | $\nu_5 = 95.15$ |
| $r_4 =$ | $-111.3338$ | | | |
| | $d_4 = 1.1629$ | | | |
| $r_5 =$ | $-100.3938$ | | | |
| | $d_5 = 1.6917$ | | $n_3 = 1.79952$ | $\nu_3 = 42.24$ |
| $r_6 =$ | 148.9689 | | | |
| | $d_6 = 26.7082$ | | | |
| $r_7 =$ | $-54.0767$ | | | |
| | $d_7 = 1.4710$ | | $n_4 = 1.80518$ | $\nu_4 = 25.43$ |
| $r_8 =$ | $-18.9307$ | | | |
| | $d_8 = 0.8277$ | | $n_5 = 1.61340$ | $\nu_5 = 43.84$ |
| $r_9 =$ | 21.4914 | | | |
| | $d_9 = 11.0252$ | | | |
| $r_{10} =$ | 100.5557 | | | |
| | $d_{10} = 0.8159$ | | $n_6 = 1.70154$ | $\nu_6 = 41.21$ |
| $r_{11} =$ | 15.1240 | | | |
| | $d_{11} = 2.1685$ | | $n_7 = 1.72600$ | $\nu_7 = 53.56$ |
| $r_{12} =$ | $-56.5946$ | | | |

$$\frac{\phi_1}{\phi_2} = 0.523, \quad \left|\frac{\phi_3}{\phi_1}\right| = 1.402, \quad \frac{r_3 + r_4}{r_3 - r_4} = -0.576$$

$$\left|\frac{\phi_{II}}{\phi_{III}}\right| = 1.582, \quad n_4 - n_5 = 0.192, \quad \nu_4 - \nu_5 = -18.41$$

$$\nu_a - \nu_b = \nu_6 - \nu_7 = -12.35$$

| | $d_6$ | $d_9$ |
|---|---|---|
| ∞ | 26.708 | 11.025 |
| 1218 | 29.169 | 5.136 |

Embodiment 3

| | $f = 100$, | $F/4$, | $2\omega = 5.1°$ | |
|---|---|---|---|---|
| $r_1 =$ | 175.8447 | | | |
| | $d_1 = 2.9072$ | | $n_1 = 1.49700$ | $\nu_1 = 81.61$ |
| $r_2 =$ | $-77.8818$ | | | |
| | $d_2 = 0.3116$ | | | |
| $r_3 =$ | 29.0626 | | | |
| | $d_3 = 4.3123$ | | $n_2 = 1.43389$ | $\nu_2 = 95.15$ |
| $r_4 =$ | $-81.5380$ | | | |
| | $d_4 = 1.1616$ | | | |
| $r_5 =$ | $-76.2256$ | | | |
| | $d_5 = 1.6898$ | | $n_3 = 1.80440$ | $\nu_3 = 39.58$ |
| $r_6 =$ | 212.5711 | | | |
| | $d_6 = 20.5368$ | | | |

-continued

| f = 100, | F/4, | 2ω = 5.1° | |
|---|---|---|---|
| $r_7 = -118.6128$ | | | |
| | $d_7 = 1.4691$ | $n_4 = 1.80518$ | $\nu_4 = 25.43$ |
| $r_8 = -24.9810$ | | | |
| | $d_8 = 0.8274$ | $n_5 = 1.61340$ | $\nu_5 = 43.84$ |
| $r_9 = 23.6617$ | | | |
| | $d_9 = 10.5959$ | | |
| $r_{10} = 193.4989$ | | | |
| | $d_{10} = 0.8150$ | $n_6 = 1.68893$ | $\nu_6 = 31.08$ |
| $r_{11} = 19.8467$ | | | |
| | $d_{11} = 2.1665$ | $n_7 = 1.70154$ | $\nu_7 = 41.21$ |
| $r_{12} = -70.2010$ | | | |

$$\frac{\phi_1}{\phi_2} = 0.458, \left|\frac{\phi_3}{\phi_1}\right| = 1.567, \frac{r_3 + r_4}{r_3 - r_4} = -0.474$$

$$\left|\frac{\phi_{II}}{\phi_{III}}\right| = 1.780, n_4 - n_5 = 0.192, \nu_4 - \nu_5 = -18.41$$

$$\nu_a - \nu_b = \nu_6 - \nu_7 = -10.13$$

| | $d_6$ | $d_9$ |
|---|---|---|
| ∞ | 20.537 | 10.596 |
| 1216 | 22.545 | 3.925 | wherein the reference symbols $r_1, r_2, \ldots$ represent radii of curvature on the surface of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2 \ldots$ represent Abbe's numbers of the respective lens elements.

Figure 3:
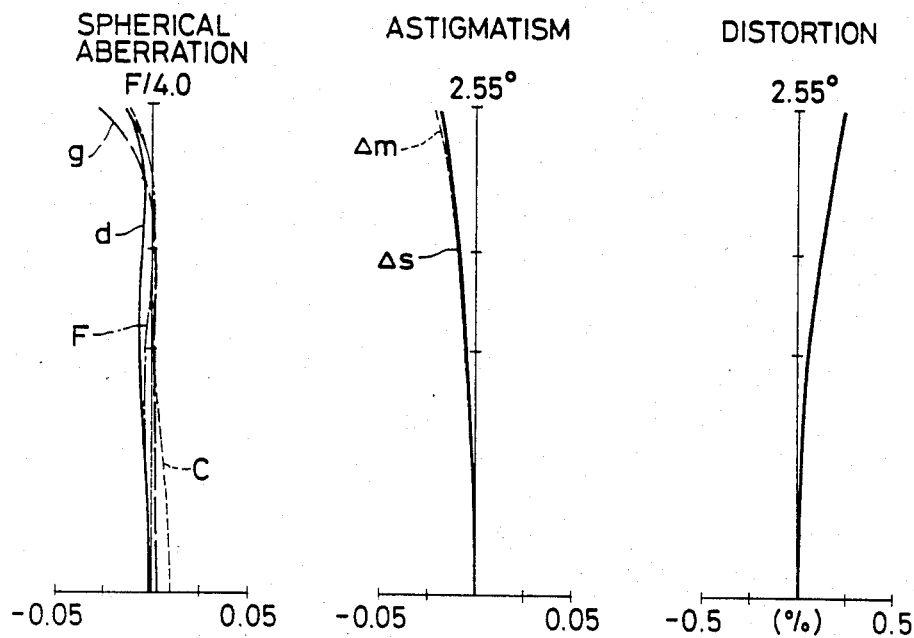
FIG. 3 and FIG. 4 show curves illustrating aberration characteristics of the Embodiment 1 when it is focused on objects located at infinite distance and a short distance respectively.
Figure 4:
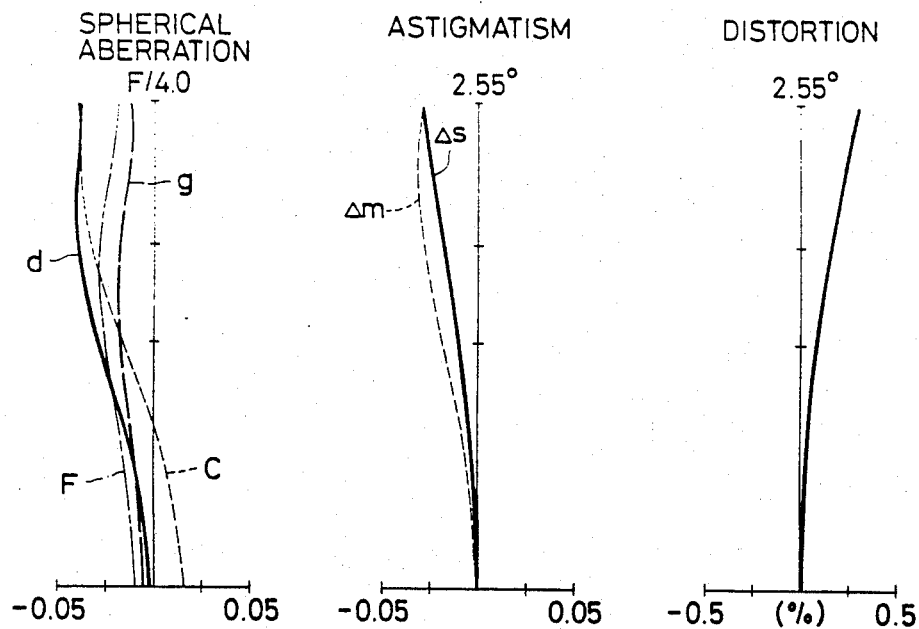

Out of the Embodiments described above, the Embodiment 1 has the composition shown in FIG. 1. Speaking concretely, the front lens group comprises a positive lens component, a positive lens component and a negative lens component, the first subgroup arranged in the rear lens group comprises a negative cemented lens component and a negative lens component, and the second subgroup comprises a positive cemented lens component. This lens system is so designed as to perform focusing by varying airspaces $d_6$ and $d_{11}$. $d_6$ and $d_{11}$ have the values specified in the numerical data when the lens system is focused on objects located at infinite distance (∞) and 1216. Abberation characteristics of the Embodiment 1 when it is focused on these objects are illustrated in FIG. 3 and FIG. 4 respectively.

Figure 2:
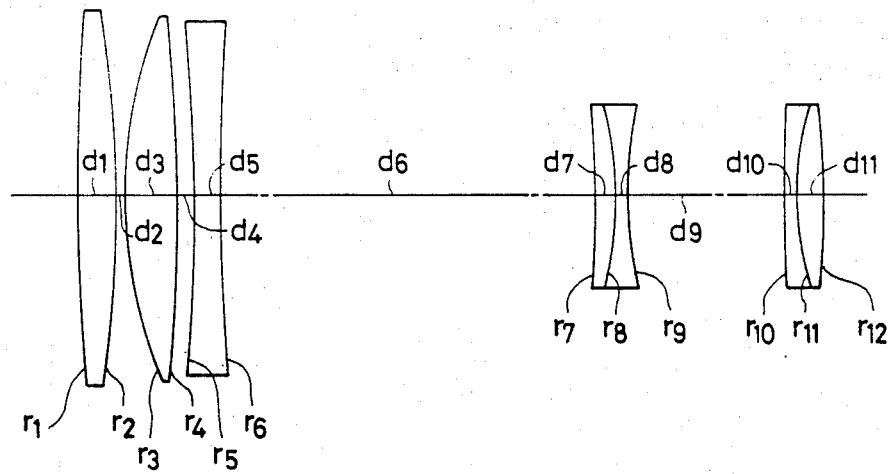
FIG. 2 shows a sectional view illustrating composition of Embodiments 2 and 3 of the telephoto lens system according to the present invention.

The Embodiments 2 and 3 have the composition shown in FIG. 2. As is seen from this drawing, these Embodiments are different from the Embodiment 1 in that the former adopts the first subgroup comprising a negative cemented lens component only. These Embodiments are so designed as to perform focusing by varying the airspaces $d_6$ and $d_9$.

Figure 5:
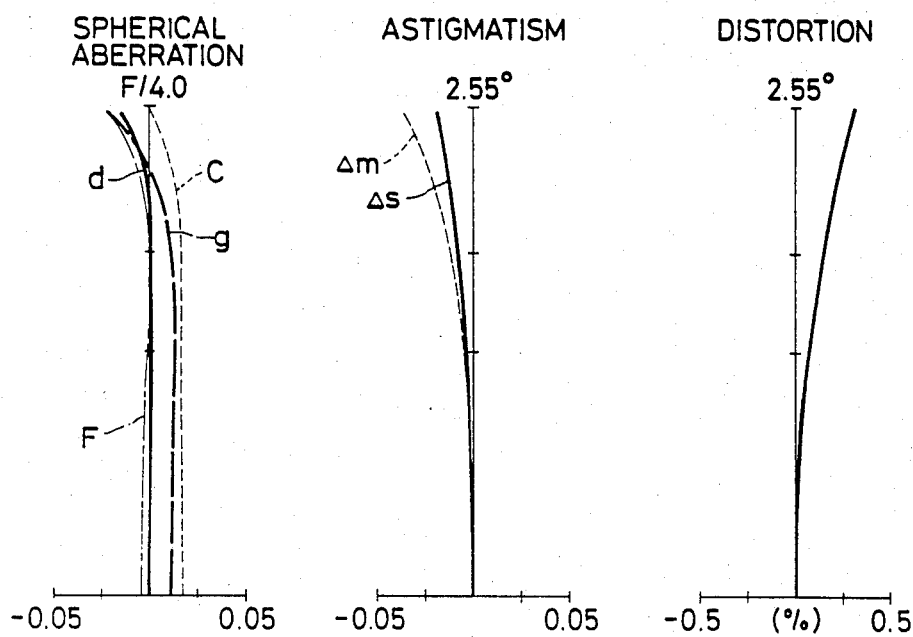
FIG. 5 and FIG. 6 show curves illustrating aberration characteristics of the Embodiment 2 when it is focused on objects located at infinite distance and a short distance respectively.
Figure 6:
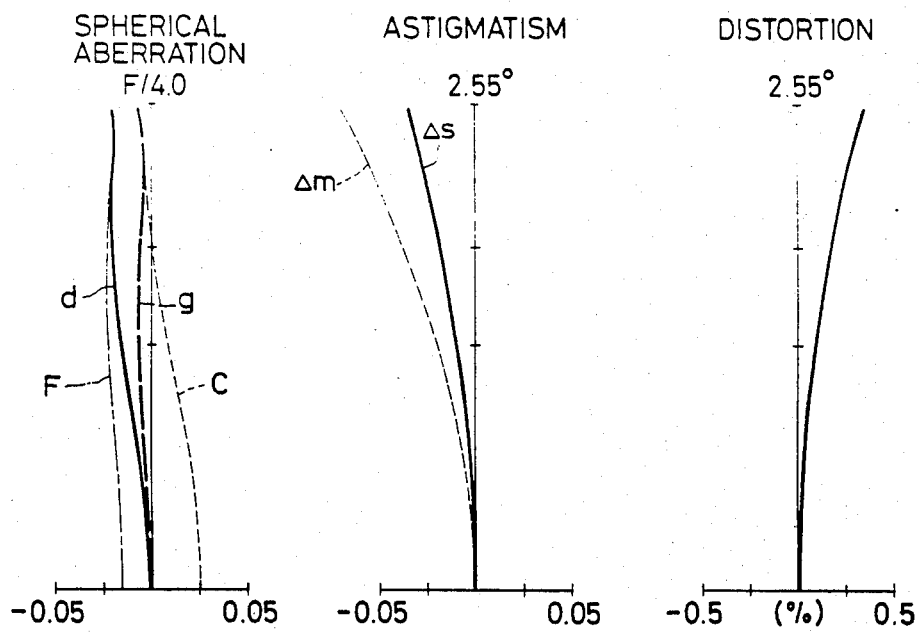

When the Embodiment 2 is focused on objects located at infinite distance and a short distance of 1218, the airspaces $d_6$ and $d_9$ have the values described in the numerical data. Aberration characteristics of the Embodiment 2 at these focusing distances are illustrated in FIG. 5 and FIG. 6 respectively.

Figure 7:
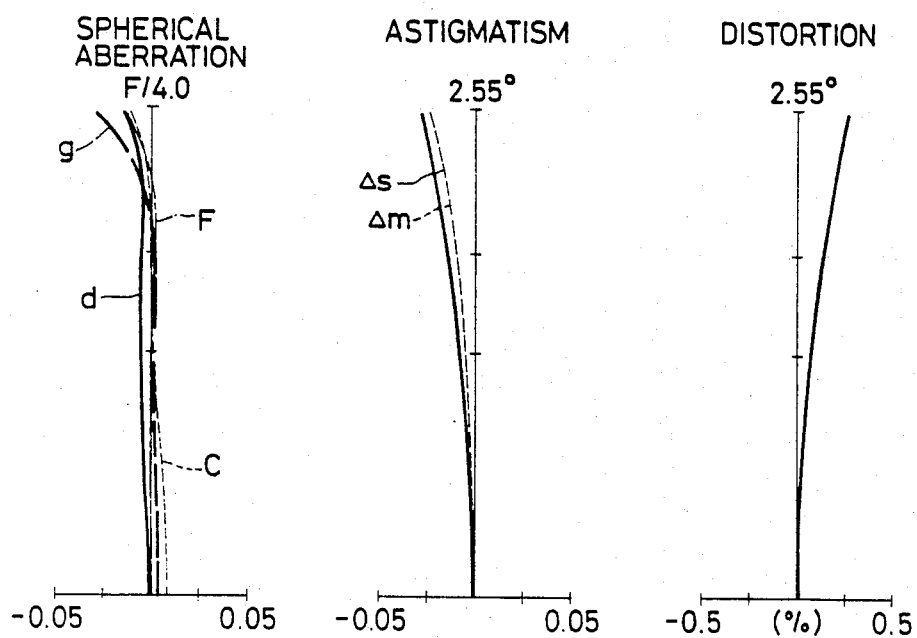
FIG. 7 and FIG. 8 show curves illustrating aberration characteristics of the Embodiment 3 when it is focused on objects located at infinite distance and a short distance respectively.
Figure 8:
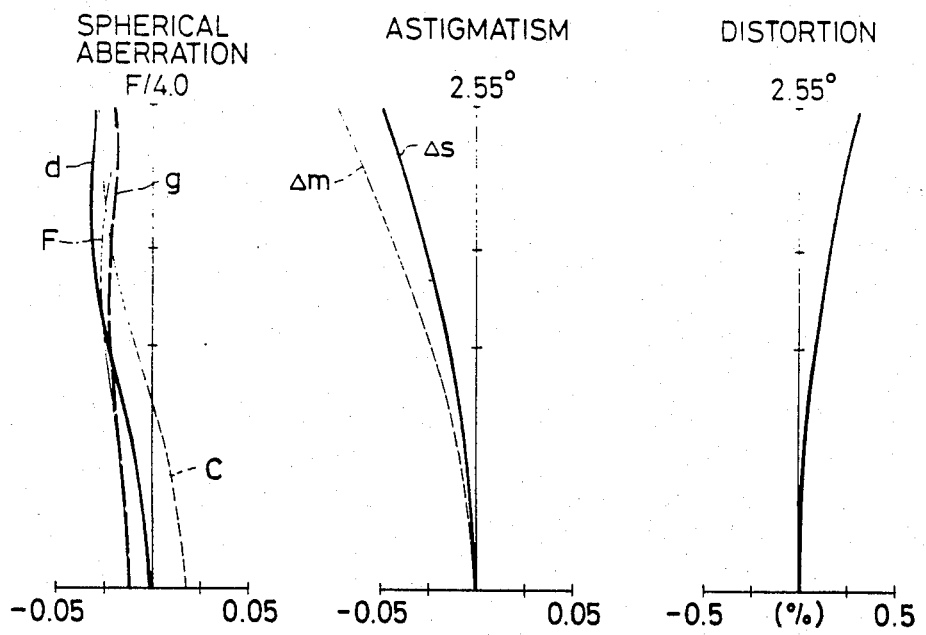

When the Embodiment 3 is focused on objects located at infinite distance and a short distance of 1216, the airspaces $d_6$ and $d_9$ have the values described in the numerical data. Aberration characteristics of the Embodiment 3 at these focusing distances are illustrated in FIG. 7 and FIG. 8 respectively.

As is understood from the foregoing detailed description and Embodiments, the telephoto lens system according to the present invention has a large aperture ratio and favorably corrected aberrations since it comprises the front lens group, and the first and second subgroups in the rear lens group arranged as described above, and so designed as to satisfy the conditions (1) through (3).

Further, the lens system can be focused on objects located within a range from infinite to short distance with little variations of aberrations by displacing the first and second subgroups independently so as to vary the airspace reserved therebetween. For this purpose, the lens system should desirably satisfy the condition (4).

Further, the secondary spectrum can be eliminated more effectively by selecting a suitable glass material for the front lens group.

I claim:

1. A telephoto lens system comprising a front lens group, and a rear lens group comprising a first subgroup and a second subgroup, said front lens group comprising a first positive lens component, a second positive lens component and a negative lens component, and having positive refractive power as a whole, said first subgroup comprising a negative cemented lens component and having negative refractive power as a whole, said second subgroup comprising a positive cemented lens component and having positive refractive power as a whole, and said lens system being so designed as to satisfy the following conditions (1) through (3):

$$0.2 < \frac{\phi_1}{\phi_2} < 0.8 \quad (1)$$

$$-1 < \frac{r_3 + r_4}{r_3 - r_4} < 0 \quad (2)$$

$$1 < \left|\frac{\phi_3}{\phi_1}\right| < 2 \quad (3)$$

wherein the reference symbols $\phi_1$, $\phi_2$, and $\phi_3$ represent refractive powers of the first positive lens component, second positive lens component and negative lens component respectively arranged in said front lens group, and the reference symbols $r_3$ and $r_4$ designate radii of curvature on the object side surface and image side surface respectively of the second positive lens component arranged in said front lens group.

2. A telephoto lens system according to claim 1 so adapted as to perform focusing by displacing said first and second subgroups along the optical axis while varying the airspace reserved therebetween.

3. A telephoto lens system according to claim 2 so adapted as to perform focusing on an object located at a short distance by displacing said first subgroup and said second subgroup toward the image side and object side respectively.

4. A telephoto lens system according to claim 3 so adapted as to satisfy the following condition (4):

$$1 < |\phi_{II}/\phi_{III}| < 3 \quad (4)$$

wherein the reference symbols $\phi_{II}$ and $\phi_{III}$ represents refractive powers of said first and second subgroups respectively.

5. A telephoto lens system according to claim 4 so adapted as to satisfy the following conditions (5) through (7):

$$0.1 < |n_4 - n_5| \quad (5)$$

$$10 < |\nu_4 - \nu_5| \quad (6)$$

$$5 < |\nu_a - \nu_b| \quad (7)$$

wherein the reference symbols $n_4$ and $n_5$ represent refractive indices of both the lens elements of the negative cemented lens component arranged in said first subgroup, the reference symbols $\nu_4$ and $\nu_5$ designate Abbe's numbers of both the lens elements of the negative cemented lens component arranged in said first subgroup, and the reference symbols $\nu_a$ and $\nu_b$ denote Abbe's numbers of both the lens elements of the positive cemented lens component arranged in said second subgroup.

6. A telephoto lens system according to claim 4 wherein said first subgroup comprises a negative cemented lens component and a negative lens component, said lens system having the following numerical data:

| f = 100, | F/4, | 2ω = 5.1° |
|---|---|---|
| $r_1 = 144.4586$ | | |
| $d_1 = 2.9054$ | $n_1 = 1.49700$ | $\nu_1 = 81.61$ |
| $r_2 = -81.4129$ | | |
| $d_2 = 0.3106$ | | |
| $r_3 = 26.7945$ | | |
| $d_3 = 4.3918$ | $n_2 = 1.43389$ | $\nu_2 = 95.15$ |
| $r_4 = -87.9322$ | | |
| $d_4 = 1.1610$ | | |
| $r_5 = -83.2180$ | | |
| $d_5 = 1.6889$ | $n_3 = 1.80440$ | $\nu_3 = 39.58$ |
| $r_6 = 184.2057$ | | |
| $d_6 = 19.6181$ | | |
| $r_7 = -85.1515$ | | |
| $d_7 = 1.4686$ | $n_4 = 1.80518$ | $\nu_4 = 25.43$ |
| $r_8 = -22.7746$ | | |
| $d_8 = 0.8263$ | $n_5 = 1.61340$ | $\nu_5 = 43.84$ |
| $r_9 = 20.4856$ | | |
| $d_9 = 1.4433$ | | |
| $r_{10} = -239.0739$ | | |
| $d_{10} = 0.8262$ | $n_6 = 1.57309$ | $\nu_6 = 42.57$ |
| $r_{11} = 183.2627$ | | |
| $d_{11} = 7.2647$ | | |
| $r_{12} = 58.0617$ | | |
| $d_{12} = 0.8145$ | $n_7 = 1.62004$ | $\nu_7 = 36.25$ |
| $r_{13} = 34.5908$ | | |
| $d_{13} = 2.1649$ | $n_8 = 1.61800$ | $\nu_8 = 63.38$ |
| $r_{14} = -59.4044$ | | |

$$\frac{\phi_1}{\phi_2} = 0.455, \left|\frac{\phi_3}{\phi_1}\right| = 1.481, \frac{r_3 + r_4}{r_3 - r_4} = -0.533$$

$$\left|\frac{\phi_{II}}{\phi_{III}}\right| = 1.779, n_4 - n_5 = 0.192, \nu_4 - \nu_5 = -18.41$$

$$\nu_a - \nu_b = \nu_7 - \nu_8 = -27.13$$

| | $d_6$ | $d_{11}$ |
|---|---|---|
| ∞ | 19.6181 | 7.2647 |
| 1216 | 21.6039 | 2.1367 | wherein the reference symbols $r_1$ through $r_{14}$ represent radii of curvature on the surfaces of the respective lens elements, the reference symbols $d_1$ through $d_{13}$ designate thicknesses of the respective lens elements and airspaces reserved therebetween, the reference symbols $n_1$ through $n_8$ denote refractive indices of the respective lens elements, the reference symbols $\nu_1$ through $\nu_8$ represent Abbe's numbers of the respective lens elements and the reference symbol f designates focal length of the lens system as a whole.

7. A telephoto lens system according to claim 4 having the following numerical data:

| f = 100, | F/4, | 2ω = 5.1° |
|---|---|---|
| $r_1 = 136.5419$ | | |
| $d_1 = 2.9120$ | $n_1 = 1.45600$ | $\nu_1 = 90.31$ |
| $r_2 = -73.1087$ | | |
| $d_2 = 0.3112$ | | |
| $r_3 = 29.9494$ | | |
| $d_3 = 3.9034$ | $n_2 = 1.43389$ | $\nu_5 = 95.15$ |
| $r_4 = -111.3338$ | | |
| $d_4 = 1.1629$ | | |
| $r_5 = -100.3938$ | | |
| $d_5 = 1.6917$ | $n_3 = 1.79952$ | $\nu_3 = 42.24$ |
| $r_6 = 148.9689$ | | |
| $d_6 = 26.7082$ | | |
| $r_7 = -54.0767$ | | |
| $d_7 = 1.4710$ | $n_4 = 1.80518$ | $\nu_4 = 25.43$ |
| $r_8 = -18.9307$ | | |
| $d_8 = 0.8277$ | $n_5 = 1.61340$ | $\nu_5 = 43.84$ |
| $r_9 = 21.4914$ | | |
| $d_9 = 11.0252$ | | |
| $r_{10} = 100.5557$ | | |
| $d_{10} = 0.8159$ | $n_6 = 1.70154$ | $\nu_6 = 41.21$ |
| $r_{11} = 15.1240$ | | |
| $d_{11} = 2.1685$ | $n_7 = 1.72600$ | $\nu_7 = 53.56$ |
| $r_{12} = -56.5946$ | | |

$$\frac{\phi_1}{\phi_2} = 0.523, \left|\frac{\phi_3}{\phi_1}\right| = 1.402, \frac{r_3 + r_4}{r_3 - r_4} = -0.576$$

$$\left|\frac{\phi_{II}}{\phi_{III}}\right| = 1.582, n_4 - n_5 = 0.192, \nu_4 - \nu_5 = -18.41$$

$$\nu_a - \nu_b = \nu_6 - \nu_7 = -12.35$$

| | $d_6$ | $d_9$ |
|---|---|---|
| ∞ | 26.708 | 11.025 |
| 1218 | 29.169 | 5.136 | wherein the reference symbols $r_1$ through $r_{12}$ represent radii of curvature on the surfaces on the respective lens elements, the reference symbols $d_1$ and $d_{11}$ designate thicknesses of the respective lens elements and airspaces reserved therebetween, the reference symbols $n_1$ through $n_7$ denote refractive indices of the respective lens elements, the reference symbols $\nu_1$ through $\nu_7$ represent Abbe's numbers of the respective lens elements and the reference symbol f designates focal length of the lens system as a whole.

8. A telephoto lens system according to claim 4 having the following numerical data:

| f = 100, | F/4, | 2ω = 5.1° |
|---|---|---|
| $r_1 = 175.8447$ | | |
| $d_1 = 2.9072$ | $n_1 = 1.49700$ | $\nu_1 = 81.61$ |
| $r_2 = -77.8818$ | | |
| $d_2 = 0.3116$ | | |
| $r_3 = 29.0626$ | | |
| $d_3 = 4.3123$ | $n_2 = 1.43389$ | $\nu_2 = 95.15$ |
| $r_4 = -81.5380$ | | |
| $d_4 = 1.1616$ | | |
| $r_5 = -76.2256$ | | |
| $d_5 = 1.6898$ | $n_3 = 1.80440$ | $\nu_3 = 39.58$ |
| $r_6 = 212.5711$ | | |
| $d_6 = 20.5368$ | | |
| $r_7 = -118.6128$ | | |

-continued

| | f = 100, | F/4, | 2ω = 5.1° | |
|---|---|---|---|---|
| | $d_7 = 1.4691$ | | $n_4 = 1.80518$ | $\nu_4 = 25.43$ |
| $r_8 = -24.9810$ | | | | |
| | $d_8 = 0.8274$ | | $n_5 = 1.61340$ | $\nu_5 = 43.84$ |
| $r_9 = 23.6617$ | | | | |
| | $d_9 = 10.5959$ | | | |
| $r_{10} = 193.4989$ | | | | |
| | $d_{10} = 0.8150$ | | $n_6 = 1.68893$ | $\nu_6 = 31.08$ |
| $r_{11} = 19.8467$ | | | | |
| | $d_{11} = 2.1665$ | | $n_7 = 1.70154$ | $\nu_7 = 41.21$ |
| $r_{12} = -70.2010$ | | | | |

$$\frac{\phi_1}{\phi_2} = 0.458, \quad \left|\frac{\phi_3}{\phi_1}\right| = 1.567, \quad \frac{r_3 + r_4}{r_3 - r_4} = -0.474$$

-continued f = 100, F/4, 2ω = 5.1°

$$\left|\frac{\phi_{II}}{\phi_{III}}\right| = 1.780, \quad n_4 - n_5 = 0.192, \quad \nu_4 - \nu_5 = -18.41$$

$$\nu_a - \nu_b = \nu_6 - \nu_7 = -10.13$$

| | $d_6$ | $d_9$ |
|---|---|---|
| ∞ | 20.537 | 10.596 |
| 1216 | 22.545 | 3.925 | wherein the reference symbols $r_1$ through $r_{12}$ represent radii of curvature on the surfaces of the respective lens elements, the reference symbols $d_1$ through $d_{11}$ designate thicknesses of the respective lens elements and airspaces reserved therebetween, the reference symbols $n_1$ through $n_7$ denote refractive indices of the respective lens elements, the reference symbols $\nu_1$ through $\nu_7$ represent Abbe's numbers of the respective lens elements and the reference symbol f designates focal length of the lens system as a whole.

* * * * *